United States Patent [19]

Lamare et al.

[11] 4,188,620
[45] Feb. 12, 1980

[54] PHASE DECODER

[75] Inventors: Jean-Claude Lamare, Ezanville; Christian Maury, Velizy, both of France

[73] Assignee: Compagnie Internationale pour l'Informatique, Paris, France

[21] Appl. No.: 959,097

[22] Filed: Nov. 9, 1978

[30] Foreign Application Priority Data

Nov. 14, 1977 [FR] France ................................ 77 34162

[51] Int. Cl.$^2$ ........................................... H03K 13/24
[52] U.S. Cl. .............................. 340/347 DD; 360/42
[58] Field of Search .................. 340/347 DD; 360/40, 360/42; 178/66, 67, 68; 325/20, 21; 307/352

[56] References Cited

U.S. PATENT DOCUMENTS

| | | | |
|---|---|---|---|
| 3,361,978 | 1/1968 | Fiorini | 340/347 DD |
| 3,699,554 | 10/1972 | Jones | 340/347 DD |
| 3,789,207 | 1/1974 | Jones | 340/347 DD X |
| 3,818,501 | 6/1974 | Fiorino | 360/40 |
| 3,864,583 | 2/1975 | Fiorino | 340/347 DD |
| 3,877,027 | 4/1975 | Marino | 340/347 DD |

Primary Examiner—Charles D. Miller
Attorney, Agent, or Firm—Lowe, King, Price & Becker

[57] ABSTRACT

The binary value of coded signals having opposite going transitions normally in the center of a bit cell, wherein the direction of the transition determines the binary value of the bit cell, is detected. The repetition rate of bit cells of a coded signal control the rate which a signal to be integrated is accumulated by an integrator. The integration duration is controlled by the length of the bit cell. The direction of integration is controlled by the direction of the center transition of each bit cell. In response to the amplitude of the accumulated signal at the end of the integration duration being greater or less than a reference amplitude, the binary value of the bit in the bit cell is determined. Integration is performed by first and second integrators respectively activated to accumulate the signal to be integrated during odd and even numbered bit cells. The first and second integrators are reset to zero during even and odd numbered bit cells, respectively. The accumulated signals of the first and second integrators are sensed prior to resetting thereof to indicate the binary values of the odd and even numbered bit cells.

8 Claims, 9 Drawing Figures

PRIOR ART

FIG. 1

PRIOR ART

PRIOR ART

PHASE DECODER

FIELD OF INVENTION

The present invention relates to an apparatus for and method of integrating a series of electrical signals, and more particularly, to an integrating apparatus and method wherein the accumulation rate for a signal to be integrated is a function of the repetition rate of the signal. While the present invention is described in connection with an apparatus for detecting data recorded on a magnetic tape of a magnetic tape deck, it is clear that the description is equally applicable to any appropriate electric signal detecting apparatus.

BACKGROUND OF THE INVENTION

In present day data-processing systems, magnetic tape decks are commonly used because they have large storage capacity, and require relatively short times for magnetic read/write heads to access data contained anywhere on the magnetic recording tapes from the moment when the heads receive a data access command from the processing system. Magnetic tapes carry data, in coded (usually binary) form, on parallel recording tracks (usually nine) having widths that do not exceed a few hundredths of a millimeter. It is current practice for tape decks to carry only a single removable magnetic tape which is replaced by another tape as soon as reading and/or writing operations involving the first tape have been completed.

Each read-out track of a tape has associated with it a read/write head which is positioned very close to, or even in contact with, the track. The tape moves discontinuously past an assembly formed by the heads for all of the recording tracks. The discontinuous movement is a sequence of "unitary movements", each comprising: (a) a tape speed up phase, during which the tape has a high acceleration; (b) a phase during which the tape moves at a substantially constant speed $V_O$, and (c) a braking phase during which the tape has a high deceleration until it is completely stopped. It is current practice for the data to be read, during each "unitary movement", after the speed up phase, while the tape is moving at constant speed $V_O$.

What are termed slow variations in the tape speed are speed variations about speed $V_O$ which take place while the data are read. Frequently these variations are ±25% of the speed $V_O$ and sometimes as great as ±50% of $V_O$. The duration of these variations is a few fractions of a millisecond. Instantaneous variations in the tape speed, on the other hand, are speed variations having durations approximately a hundred to a thousand times shorter than that of the slow variations.

When binary data bits recorded on a magnetic tape pass by an assembly of magnetic read/write heads associated with all of the recording tracks, each of the heads derives a series of analogue electric signals which are shaped into a series of square-wave electrical pulses by shaping circuits. The pulse voltage varies between minimum and maximum values $v_{min}$ and $v_{max}$. For ease of exposition, a description will be given only to the signals derived by a single head; it is to be understood that the same description is equally applicable to the signals derived by the oter heads. The leading edge of the electrical pulse is that part of the pulse during which the voltage changes from the value $V_{min}$ to the value $V_{max}$. Oppositely, the trailing edge of a pulse is that part of the pulse during which the voltage changes from the value $V_{max}$ to the value $V_{min}$. The binary codes most frequently used in writing data on magnetic tapes are such that, after the signals have been read and shaped, a bit equal to "logic one" corresponds to a leading or positive going edge of a pulse while a bit equal to "logic zero" corresponds to the trailing or negative going edge of a pulse.

The series of transduced square-wave electrical pulses constitutes a substantially cyclic signal DE having a nominal mean frequency $F_O$ and period $T_O$; hence, $T_O$ defines a single signal bit or "bit cell period". It is clear that the frequency $F_O$ of the transduced signal is porportional to the tape speed. Hence, thehigher the tape speed, the greater the number of data items read by the magnetic head per unit of time, whereby frequency $F_O$ corresponds to speed $V_O$. For any variation in the tape speed there is a corresponding frequency variation. Thus for a slow tape speed variation there is a corresponding low frequency and for an instantaneous speed variation there is a corresponding instantaneous frequency variation.

If $t_0$ is the time at which a given "bit cell" begins, the time $(t_0 + T_O/2)$ is termed the "center of the bit cell" and the time $(t_0 + T_O)$ is termed the "end of the bit cell". Each cell contains either a leading or trailing pulse edge situated in the center of the cell, and possibly, a leading or trailing edge at the end of the cell. Only rising or decaying edges situated in the center of "bit cells" are considered to represent bit values.

A transduced signal DE is supplied to an apparatus for detecting the data recorded on the magnetic tape of the tape deck. Such a detecting apparatus determines the value of each of the data bits recorded on magnetic tape and operates in three phases. During phase one, all the leading or trailing pulse edges in the center of each cell bit of signal DE are recognized to determine the value of the data bits. During phase two, each of the recognized edges is converted into a signal having an amplitude that remains constant during the period $T_O$ of this cell. A leading edge is converted into a signal of constant positive amplitude which is termed a "high level", whereas a trailing edge is converted into a signal of constant negative amplitude which is termed a "low level". The positive and negative amplitude signals are referred to collectively by the name "signal DEI". During phase three, the value of the bit corresponding to each cell is determined from signal DEI during each period $T_O$. High and low levels, respectively, correspond to bit values of one or zero.

Imperfections in the magnetic tape and magnetic reading heads, as well as slow and instantaneous tape speed variations, cause distortion in both the amplitude and the phase of the signals read by the head, so that the signal amplitude is reduced and is phase shifted. The distortion is increased by the electronic shaping circuits and the data detecting apparatus and is manifested as a shift in the time position of the edges at the beginning or center of the bit cell. It can further be shown that the distortion increases as the density of the data recorded on the magnetic tape increases, that is, as the number of data items recorded per unit of length of the magnetic tape increases. The phase and amplitude distortion of signals DE and DEI may be relatively severe.

In the prior art there are simple and effective magnetic tape data-detecting devices which enable data bits to be detected with very great accuracy despite considerable phase and amplitude distortion in the signal DEI.

Such an arrangement is described in French Pat. No. 2,138,029 entitled "Method and apparatus for detection by integration" filed May 17, 1972 by the S.T.C. company. In this prior art device the bit values are determined (phase 3) by a pair of integrators, each of which integrates the high and low levels of signal DEI during the period $T_O$ of the corresponding bit cell, which defines an integrating period.

To ascertain the bit value, it is merely necessary to determine, at the end of each period $T_O$ of one bit cell, the polarity of the integrated signal, designated DEINT. If signal DEINT is positive, or negative, the bit value is respectively equal to one or zero. After each integration operation, the integrating arrangement is returned to an initial, rest state during which the integrator output remains constant so that the sign of the integrated signal DEINT may be accurately determined from a constant reference level. Although the term is not strictly correct, the integrating arrangement is said to be reset to zero. If there were no zero reset, errors could occur when determining the polarity of DEINT and thus when determining the value of the data bits.

The integrating arrangement described in French Pat. 2,318,029 includes an integrator containing a capacitive integrating member C responsive to a charging current derived by a constant current generator regardless of the frequency $F_O$ of the signal DEI to be integrated. A device for controlling the integrator responds to signal DEI to control the direction and duration of the flow of the charging current supplied to the capacitive member C whereby the current flows during the period $T_O$ and the polarity of the integrated signal DEINT at the terminals of the capacitive member at the end of the integrating period $T_O$ is the same as signal DEI. A zero-reset circuit for the integrator resets the integrator to zero at the end of each integrating operation.

Since the voltage $V_C$ of signal DEINT, at the terminals of capacitive member C, is a linear function of time and the charging current is constant, $V_{CT_0} = kT_O = k/F_O$; where $V_{CT_0} = $ the value of $V_C$ at $T_O$, $k = I/C$, and $I$ is the constant charging current. Hence, voltage $V_{CT_0}$ varies as a function of the frequency $F_O$ of signals DE and DEI and is therefor a function of the slow or instantaneous variations in the magnetic tape speed. The effects of these variations on the voltage $V_C$, added to those of the phase and amplitude distortion already mentioned, reduce the accuracy of the integration and thus the accuracy with which the values of the data bits are determined.

BRIEF DESCRIPTION OF THE PRESENT INVENTION

The present invention enables these disadvantages to be overcome by compensating for the effects of the slow variations in the frequency $F_O$ on voltage $V_C$, by supplying the integrating member C with a charging current proportional to this frequency $F_O$.

Thus, the voltage $V_C$ remains constant regardless of slow variations of frequency $F_O$, and thus in the speed of the tape, while at the same time remaining of sufficient amplitude, when there are instantaneous variations in frequency, to allow the polarity of the integrated signal DEINT to be determined with sufficient accuracy.

In accordance with the invention, the apparatus for integrating a series of electrical signals comprises at least one integrator containing a capacitive integrating member. A device for controlling the integrator responds to the series of signals to be integrated and controls the direction and duration of the charging current for the capacitive member, as a function of the polarity and duration of each signal in the series. A circuit resets the integrator to zero at the end of the operation of integrating each signal in the series. The invention is characterized by a current generator which supplies the capacitive integrating member with a charging current proportional to the nomimal frequency $F_O$ of the series of signals.

In a preferred embodiment of the invention particularly applicable to integrating a series of signals having a high frequency $F_O$, the integrating apparatus comprises first and second integrators and a switching circuit connected between the current generator output and inputs of the first and second integrators. The switching circuit includes separate controllers for the first and second integrators, and zero reset circuits associated with the first and second integrators. The switching arrangement responds to bit cells to be integrated and feeds half of the bit cells to each of the two integrators on a time division multiplexed basis, so that one of the integrators is in an integrating operation while the other integrator is reset to zero by the zero reset circuit associated with it. Such an integrating apparatus, including a current generator common to the two integrators, is more accurate, more reliable and less expensive than prior art integrating apparatus, in particular those described in the previously mentioned French Pat. No. 2,138,029.

In accordance with another aspect of the invention, the binary value of coded signals having opposite going transitions normally in the center of a bit cell is detected. The direction of the transition determines the binary value of the bit cell. The bit cells are subject to phase distortion causing a shift in the center position of the transition. Detection involves controlling the rate at which a signal to be integrated is accumulated by an integrator means in response to the repetition rate of bit cells of a coded signal. The duration is controlled by the bit cell period.

In response to the direction of the center transition of each bit cell, the integration direction during each bit cell is controlled. The binary value of the bit in the bit cell is determined in response to the accumulated signal at the end of the integration duration relative to a reference amplitude.

Preferably, the integration is performed by first and second integrators that are respectively activated to accumulate the signal to be integrated during odd and even numbered bit cells. The first and second integrators are reset to zero during even and odd numbered bit cells. The binary values of the odd and even numbered bit cells are indicated by responding to the accumulated signals of the first and second integrators prior to resetting thereof.

The above and still further objects, features and advantages of the present invention will become apparent upon consideration of the following detailed description of one specific embodiment thereof, especially when taken in conjunction with the accompanying drawing.

Figure 1:
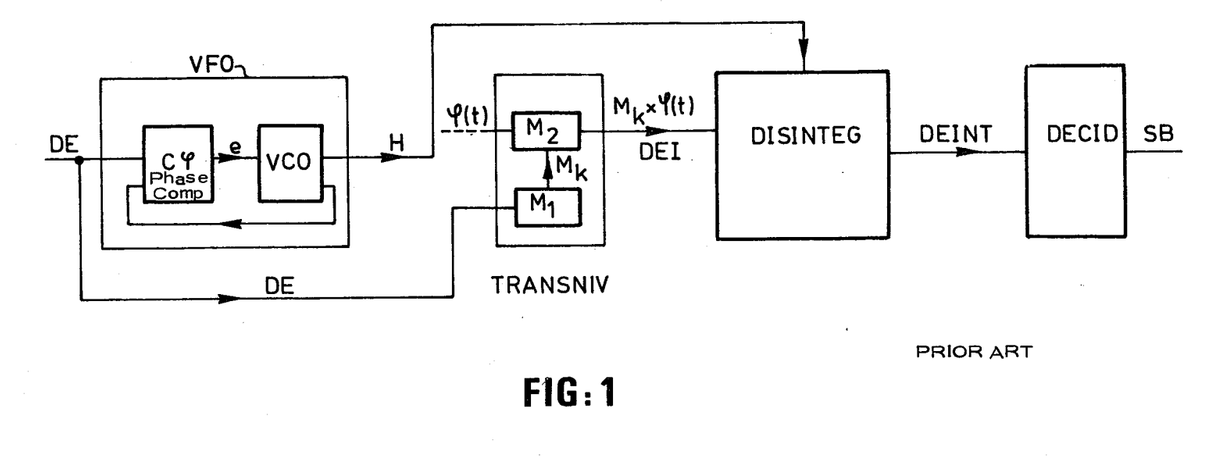
FIG. 1 is a diagram of a prior art data-detector incorporating an integrating apparatus.
Figure 2:
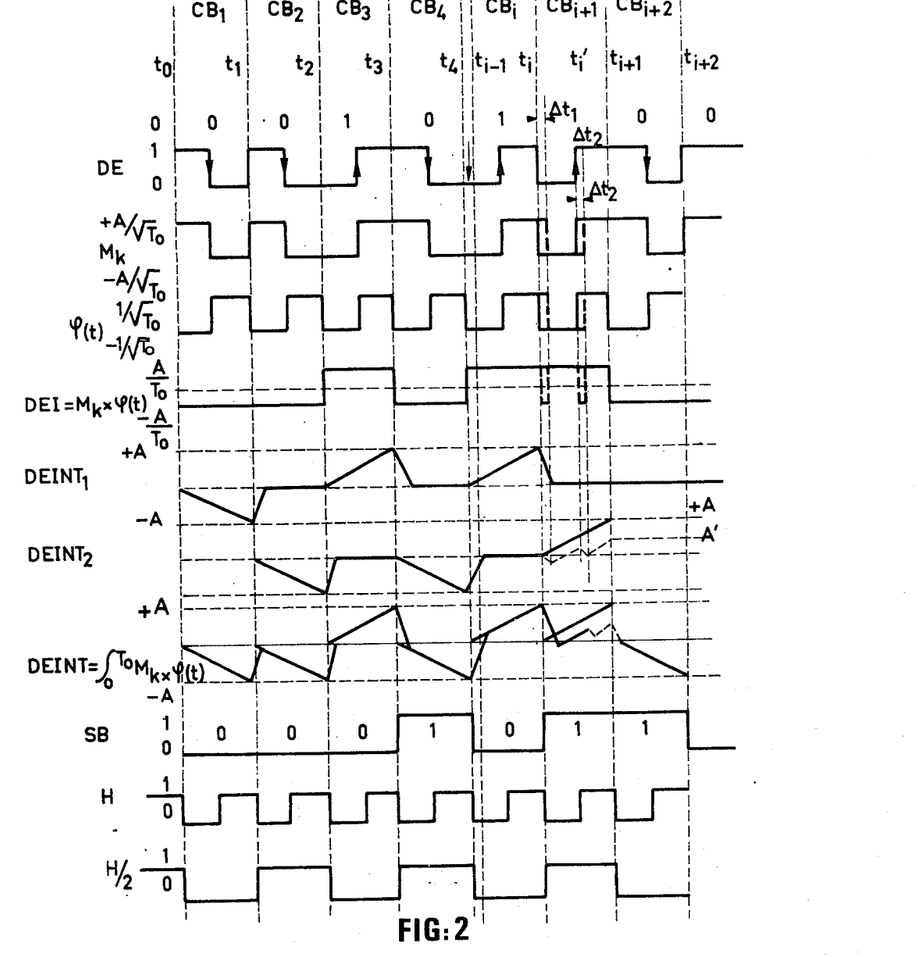
FIG. 2 is a diagram with respect to time of various signals extracted from different points in the data-detecting arrangement of FIG. 1.
Figure 3:
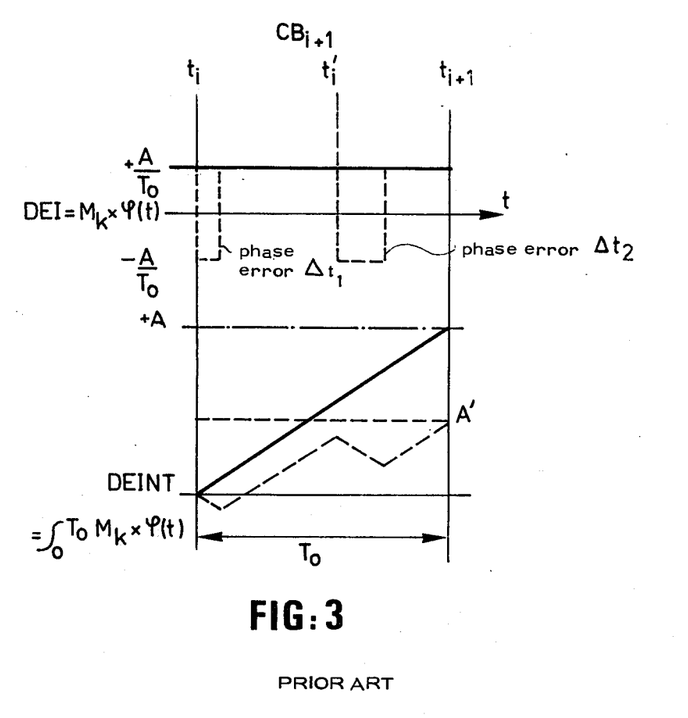
FIG. 3 are waveforms of the input and output signals of the integrating arrangement of FIG. 1 when the input signal contains phase distortion.

To better understand the construction and operating of the integrating apparatus of the invention, reference is made to FIGS. 1-3 to review a few points about the operation and construction of a prior art apparatus for detecting recorded data. The data to be detected are recorded, for example, on a magnetic tape, a tape deck, magnetic disc or any other magnetic medium forming part of a magnetic memory of a data processing system and are coupled to the detector from a magentic head as signal DE.

The main components of the prior art detector are: a variable frequency oscillator $VF_O$; a circuit TRANSNIV that responds to shaping circuits for input signal DE to transpose the shaped signal into output signal DEI; an apparatus DISINTEG which integrates signal DEI to derive output signal DEINT; a decision circuit DECID which determines the sign of integrated signal DEINT to determine the binary value of data bits of signal DE.

Variable frequency oscillator $VF_O$ has an input responsive to input signal DE (FIG. 2) derived by shaping circuits for a series of signals derived by magnetic read/write heads of a tape deck (not shown to simplify FIG. 1). Signal DE is a series of logic pulses in the binary "PE" code, a code frequently used in magnetic memories. As illustrated by waveform DE, FIG. 2, signal DE contains a succession of bit cells $CB_1$, $CB_2$, $CB_3$, $CB_i$, $CB_{i+1}$, $CB_n$, each having a period $T_O$, so bit cell $CB_1$ lies between times $t_0$ and $t_1$, cell $CB_2$ between times $t_1$ and $t_2$, cell $CB_i$ between times $t_{i-1}$ and $t_i$, and so on. Each bit cell $CB_i$ contains a data bit having a value that is a function of the transition direction of a pulse edge situated in the center of cell $CB_i$, i.e. at time $(t_0+t_1)/2$ in the case of cell $CB_1$, $(t_1+t_2)/2$ in the case of cell $CB_2$, $(t_{i-1}+t_i)/2$ in the case of cell $CB_i$, and so on. Positive and negative going transitions respectively represent binary one and zero values. Hence, for cells $CB_1$, $CB_2$, $CB_4$, $CB_{i+2}$, the data bits all have binary zero values, while cells $CB_3$, $CB_i$, $CB_{i+1}$ have binary one data bit values.

Variable frequency oscillator VFO contains phase comparator $C\phi$ and a voltage controlled oscillator VCO which generates a sampling, clock signal H having a frequency $F_H$ substantially equal to $1/T_O$. Thereby, the frequency of signal H corresponds to the nominal frequency $F_O$ of input signal DE, so each period of signal H corresponds to the period $T_O$ of one cell of signal DE. Phase comparator $C\phi$ compares the frequencies of signals H and DE which are applied to its inputs, to derive a d.c. signal having a voltage amplitude $e = kF_O$, proportional to the frequency $F_O$. The d.c. signal of comparator C is supplied to the frequency control input of voltage controlled oscillator VCO which is a function of voltage e. If the frequency $F_H$ of signal H is greater than the nominal frequency $F_O$ of signal DE, voltage e is reduced, to alter the frequency $F_H$ of signal H in a direction such that finally $F_O \simeq F_N$. Thus, the frequency of the input signal DE and the frequency of clock signal H are both hereafter referred to as $F_O$.

Level transposition circuit TRANSNIV converts input signal DE into a signal DEI which is to be integrated by integrating apparatus DISINTEG. As can be seen from waveform DEI, FIG. 2, the level of signal DEI is normally constant for the entire duration $T_O$ of a bit cell at either a positive or negative level which respectively correspond with binary one and zero cell values. However, if signal DE contains phase distortion, as during cell $CB_{i+1}$, the value of signal DE is subject to change during a cell as described intra. Phase distortion occurs if the transition is not in the center of the bit cell. In other words, for each bit cell, circuit TRANSNIV normally converts a PE coded signal DE into a signal DEI having a bit value that is a function of the transition direction of the DE signal. It is clear that it is easier to detect the value of a bit in response to signal DEI than in response to signal DE.

To convert signal DE into signal DEI, circuit TRANSNIV includes a signal multiplier $M_1$ that responds to signal DE and a fixed amplitude level $(A/\sqrt{T_O})$ to convert signal DE into a signal $M_k$ (waveform $M_k$, FIG. 2) having maximum and minimum amplitudes respectively equal to $A/\sqrt{T_O}$ and $-A/\sqrt{T_O}$, where A is an arbitrary constant. Signal $m_k$ and signal $\phi(t)$, derived by shifting the level of signal H so signal $\phi(t)$ has maximum and minimum amplitudes respectively equal to $+1/\sqrt{T_O}$ and $(1/\sqrt{T_O}$ are combined in multiplier $M_2$, which derives signal DEI as equal to $(m_k)(\phi(t))$. Integrating apparatus DISINTEG integrates signal DEI during each period $T_O$ of bit cells $CB_i$ to derive the signal $$\int_0^T DEI \, dt = \int_0^T M_k \cdot \phi(t) dt.$$

Decision circuit DECID responds to signal DEINT and determines its sign at the end of each integration period $T_O$ of a bit cell $CB_i$, i.e. substantially at time $t_i$. Circuit DEINT derives a logic signal SB which indicates the value of the data bit corresponding to this cell during each of these periods, i.e. between times $t_0$ and $t_1$, $t_1$ and $t_2$, $t_2$ and $t_3$, etc. In response to the signs of signal DEINT being positive and negative, logic signal SB is respectively equal to one and zero. Because the sign of signal DEINT is determined at the end of the integrating period of bit cell $CB_i$ the value signal SB during bit cell i+1 corresponds with the value of signal DE during the preceding bit cell i (see waveforms DE, DEINT and SB, FIG. 2).

Consideration is now given to bit cell $CB_{i+1}$ in FIGS. 2 and 3, FIG. 3 being an enlarged-scale view of part of FIG. 2. It is assumed that cell $CB_{i+1}$ contains two phase distortions or errors, of duration $\Delta t_1$ and $\Delta t_2$. Phase distorted signals DE, $m_e$, $\phi(t)$, DEI, DEINT are shown with dotted lines while an ideal bit cell $CB_{i+1}$ containing no phase distortion has the signals shown with solid lines, similar to the other cells $CB_1$, $CB_2$, $CB_3$, $CB_4$, $CB_i$, $CB_{i+1}$, etc. In the phase distorted cell $CB_{i+1}$ the amplitude of signal DEI changes abruptly from $A/T_O$ to $-A/T_O$ between time intervals $t_i$ and $(t_i + \Delta t_1)$, $t'_i$ and ($t'_i + \Delta t_2$). As a result, during these two intervals integrated signal DEINT has a negative slope. Hence, at the end of integrating period $T_O$ at time $t_{i+1}$, the amplitude of signal DEINT equals A′, which is less than A, the amplitude which DEINT would have reached if signal DE for the bit cell $CB_{i+1}$ had no phase error. However, with prior art techniques, the amplitude A′ is sufficient to enable decision devices DECID to determine the polarity of signal DEINT and thus the value of the data bit in cell $CB_{i+1}$.

Any phase error in signal DE, which error corresponds to an instantaneous variation in the frequency of signal DE, is converted by integrator DISINTEG into an amplitude change of signal DEINT. In accordance with the present invention, the variation of DEINT as a function of time, is used to determine the total phase error ($\Delta t_1 + \Delta t_2$), and thus the variation in the frequency of signal DE, by measuring the amplitude difference (A − A′).

Figure 4:
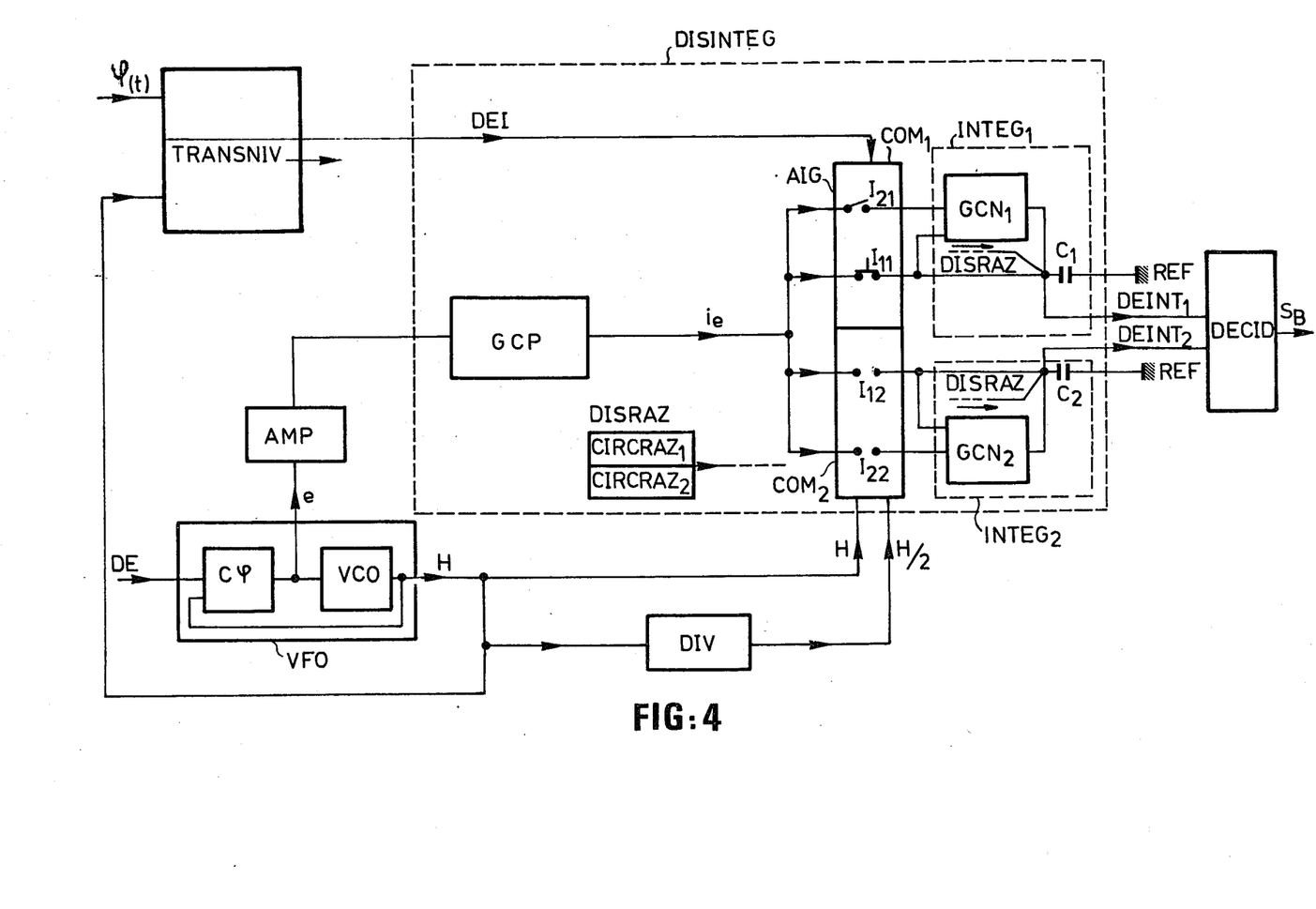
FIG. 4 is a general block diagram of a preferred embodiment of an integrating apparatus according to the invention.

As shown in FIG. 4, the principal parts of a preferred embodiment the integrating arrangement according to the invention include: a generator GCP which derives a positive current having an amplitude proportional to frequency $F_O$; two, preferably identical, integrators $INTEG_1$ and $INTEG_2$, respectively containing identical capacitive integrating members $C_1$ and $C_2$; a switching circuit AIG formed by two identical control devices $COM_1$ and $COM_2$ which respectively control integrators $INTEG_1$ and $INTEG_2$. Circuit AIG is preferably a multiplexer having two sets of switches ($I_{11}-I_{21}$), ($I_{12}-I_{22}$) respectively forming control device $COM_1$ and $COM_2$. The integrating arrangement also comprises zero reset circuit DISRAZ including two, preferably identical, zero reset circuits $CIRCRAZ_1$ and $CIRCRAZ_2$ that respectively reset integrators $INTEG_1$ and $INTEG_2$ to zero. Generator GCP is supplied to comparator $C\phi$, via an amplifier AMP, with a control voltage E proportional to the frequency $F_O$ of signal DE; generator GCP derives a current $i_e = k_1 F_O$ having an amplitude proportional to frequency $F_O$.

Current $i_e$ is supplied to switching circuit AIG, which also responds to the signal DEI to be integrated. Circuit AIG supplies current $i_e$ to capacitive integrating member $C_1$ of integrator $INTEG_1$, via control device $COM_1$, during odd numbered bit cells $CB_1$, $CB_3$, $CB_5$, $CB_k$ where $k = 2n+1$, and k is a whole number; during even numbered bit cells $CB_2$, $CB_4$, $CB_6$, current $i_c$ is supplied to capacitive integrating member $C_2$ of integrator $INTEG_2$, via control device $COM_2$. Thereby, the absolute values of charging currents $i_e$ and $i'_c$ respectively supplied to capacitors $C_1$ and $C_2$ are both virtually equal to $i_e$. The output signals of integrators $INTEG_1$ and $INTEG_2$, respectively derived from the terminals of capacitors $C_1$ and $C_2$, are $DEINT_1$ and $DEINT_2$ (FIG. 2). Signal DEINT derived by integrating circuit DISINTEG is thus such that $DEINT = DEINT_1$ during the periods of the odd bit cells and such that $DEINT = DEINT_2$ during the periods of the even bit cells. The integrator $INTEG_2$ is reset to zero by zero reset circuit $CIRCRAZ_1$ while integrator $INTEG_1$ is in an integrating operation during odd but cells; integrator $INTEG_1$ is reset to zero by zero reset circuit $CIRCRAZ_1$ while integrator $INTEG_2$ is in an integrating operation during even bit cells. From FIG. 2, the duration of the zero reset [($t'_1 - t_1$), ($t'_3 - t_3$), etc.] of each of integrators $DEINT_1$ and $DEINT_2$ is less than $T_O$. As a result, each of integrators $DEINT_1$ and $DEINT_2$ is fully reset to zero before any of its integrating operations begins.

Since the charging currents $i_c$ in each of capacitors $C_1$ and $C_2$ are such that: $i_c \simeq k_1 F_O$, the value of signal DEINT voltage $V_c$ across the terminals of each of capacitors $C_1$ and $C_2$ is, at the end of each integrating period $T_O$:

$$V_c = i_c/C \times T_O = Ck_1 T_O \times F_O = k/C = \text{constant},$$

where $C \simeq C_1 \simeq C_2$.

Thus, slow variations in the frequency $F_O$, and therefore in the speed of the magnetic tape relative to the tape deck, causes the voltage of the signal received at the output terminals of integrators $INTEG_1$ and $INTEG_2$ to remain constant. This does not occur for instantaneous frequency variations, as explained above with reference to FIGS. 2 and 3. The integrating apparatus of the invention thus makes it possible to ensure high accuracy in the detection of data bits.

Figure 5:
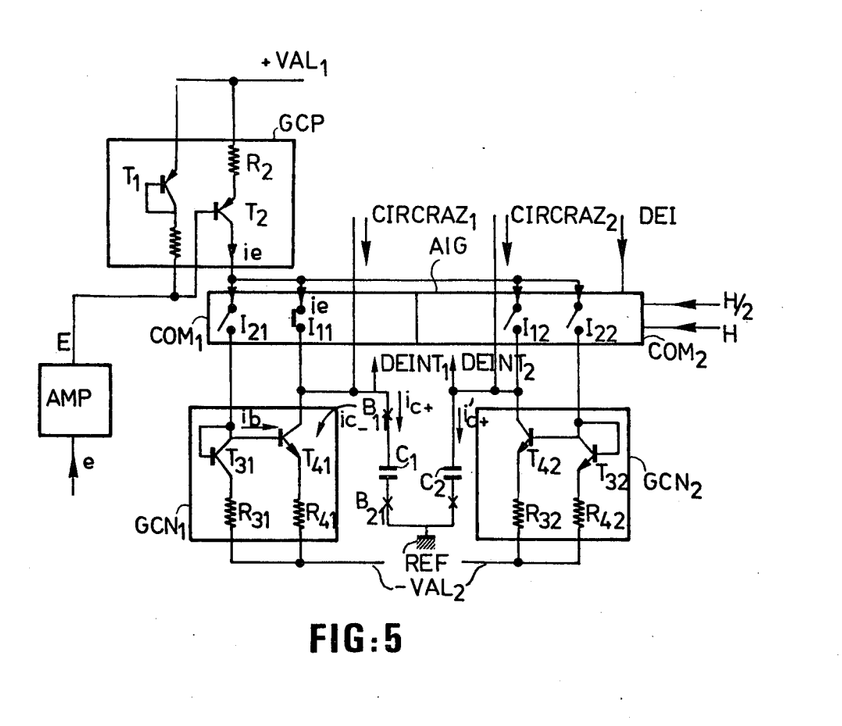
FIG. 5 is a detailed diagram of part of the integrating apparatus shown in FIG. 4.

As seen in FIGS. 4 and 5, the integrating apparatus includes generator GCP and two identical assemblies ($COM_1$ - $INTEG_1$ - $CIRCRAZ_1$) and ($COM_2$ - $INTEG_2$ - $CIRCRAZ_2$). Generator GCP is common to the two assemblies which increases still further the accuracy of the arrangement.

In cases where it is desired to detect, by integration, signals having frequencies much lower than the frequencies of the signals read by tape decks or other magnetic memories, or signals where the loss of time due to the resetting of the integrators of the integrating arrangement to zero does not have an adverse effect on the accuracy of the detection, it is possible to use an integrating arrangement comprising only the generator GCP and one of the two above mentioned assemblies, such as assembly ($COM_1$ - $INTEG_1$ - $CIRCRAZ_1$).

Figure 6:
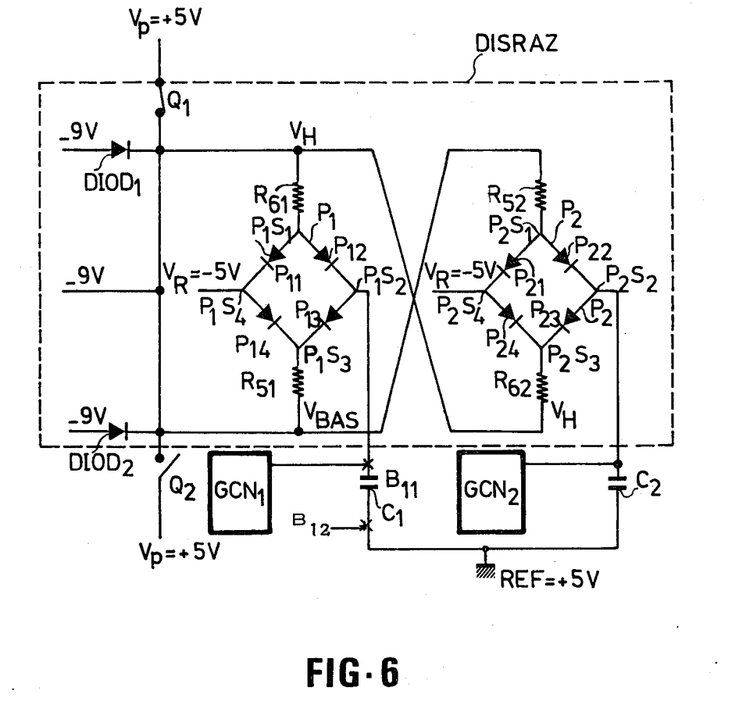
FIG. 6 is a detailed diagram of a zero reset circuit of the integrating apparatus illustrated in FIG. 4.
Figures 7, 7A, 7B, 7C:
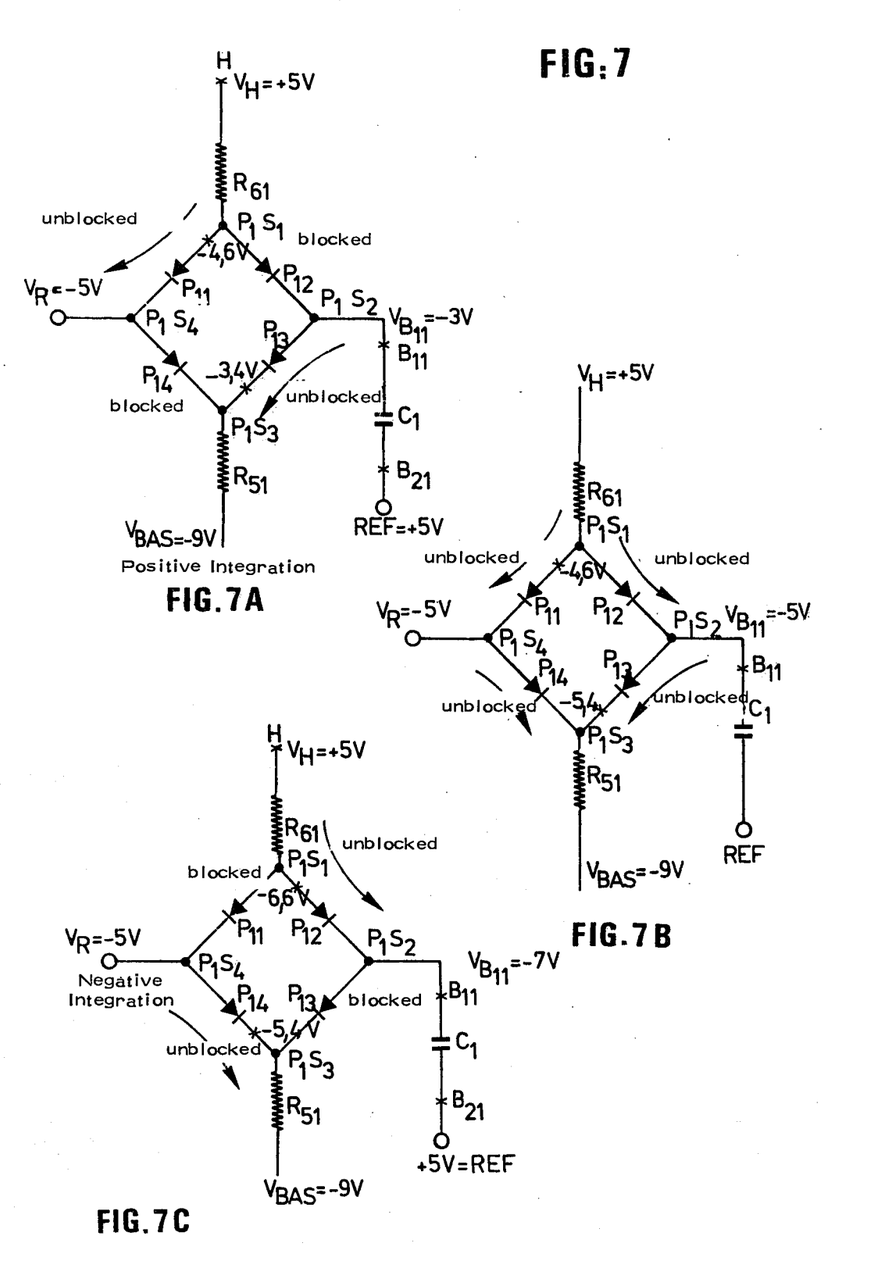
FIG. 7 (comprised of 7A-7C) is an illustration of the operation of the zero reset circuit shown in FIG. 6.

The construction of the integrating apparatus DISINTEG is shown in greater detail in FIG. 5, a circuit diagram of positive current generator GCP, the switching arrangement AIG and integrators $INTEG_1$ and $INTEG_2$. The construction and operation of zero reset arrangement DISRAZ are illustrated in FIGS. 6 and 7. From FIG. 5, current generator GCP contains two, preferably identical, PNP bipolar transistors $T_1$ and $T_2$ respectively having a collector resistor $R_1$ and an emitter resistor $R_2$. The emitters of transistors $T_1$ and $T_2$ are connected to a source of positive biassing voltage (not shown to simplify FIG. 5) which supplies a voltage $VAL_1$ directly to the emitter of transistor $T_1$ and via resistor $R_2$ to the emitter of transistor $T_2$. The base and collector of transistor $T_1$ are short circuited so the transistor functions as a thermal compensation diode for transistor $T_2$.

A control voltage E, having an amplitude proportional to the frequency $F_O$ of input signal DE, is fed to the base of transistor $T_2$ that derives an output collector current $i_e$. Current $i_e$ is fed to a first input of the switching circuit AIG, having second, third and fourth inputs respectively responsive to signals DEI, H and H/2. Signal is derived by frequency dividing signal H by a factor two, as performed by frequency divider DIV. Switches $I_{11}-I_{21}$ of control device $COM_1$ and $I_{12}-I_{22}$ of control device $COM_2$ are preferably transistor switches. Each of switches $I_{11}-I_{21}$ and $I_{12}-I_{22}$ is controlled by signals H, H/2 and DEI.

To consider the operation of circuit AIG, initially assume that signal H/2 (FIG. 2) has a binary zero value, as occurs between times $t_0$ and $t_1$, $t_2$ and $t_3$ and $t_4$ etc., when the level of H/2 is low. At these times, control device COM₁ causes integrator INTEG₁ to integrate, while zero reset circuit CIRCRAZ₂ resets integrator INTEG₂ to zero. When signal H/2 has a high value and is equal to logic one, i.e. between times t₁ and t₂, t₃ and t₄, etc., control device COM₂ causes integrator INTEG₂ to integrate while zero reset circuit CIRCRAZ₁ resets integrator INTEG₁ to zero. Hence, integration by, and zero reset of, integrators INTEG₁ and INTEG₂ are controlled by signal H/2 and are a function of the value of signal H/2.

Signal H defines the limits and the duration of the integration of signal DEI by integrators INTEG₁ and INTEG₂. Thus, if signal H/2 is assumed to be at its low level, integrator INTEG₁ starts and stops integrating signal DEI when signal H changes from logic one to logic zero, that is at the trailing edges of pulses of clock signal H, i.e. at time t₀, t₂, t₄ etc., which correspond to the beginning of integration and times t₁, t₃, t₅ etc., which in turn correspond to the end of an integration period. Similar, but complementary reasoning is applicable to integrator INTEG₂.

Signal DEI controls the polarity of the integrated signals DEINT₁ and DEINT₂ respectively derived by integrators INTEG₁ and INTEG₂ by controlling the opening and closing of the transistor switches I₁₁ and I₂₁ of control device COM₁ on the one hand, and the transistor switches I₁₂ and I₂₂ of control device COM₂ on the other hand. While each of integrators INTEG₁ and INTEG₂ is being reset to zero, the switches of the associated control devices COM₁ and COM₂ are open.

Thus, if integrator INTEG₁ is performing an integration (signal H/2 at its low level) and if signal DEI is positive, switch I₁₁ is closed and switch I₂₁ open (between times t₂ and t₃ for example), switches I₁₂ and I₂₂ being also open. The integrated signal DEINT₁ is thus positive. If signal DEI is negative, switch I₁₁ is open and switch I₂₁ is closed, (I₁₂ and I₂₂ being open), and signal DEINT₁ is thus negative. Identical reasoning is applicable to integrator INTEG₂.

As illustrated in FIG. 5, integrator INTEG₁ includes negative current generator GCN₁ and capacitor C₁, while integrator INTEG₂ includes negative current generator GCN₂ and capacitor C₂.

Current generator GCN₁ contains two, preferably identical, NPN bipolar transistors T₃₁ and T₄₁ having emitters respectively connected to a source of negative biassing voltage VAL₂ (not shown) via preferably identical resistors R₃₁ and R₄₁. Negative current generator GCN₂, which is identical to GCN₁, similarly contains identical NPN bipolar transistors T₃₂ and T₄₂ having identical emitter resistors R₃₂ and R₄₂. Transistors T₃₁ and T₃₂, by virtue of the short circuited bases and collectors thereof, are thermal compensation diodes for transistors T₄₁ and T₄₂. Each of transistors T₄₁ and T₄₂ preferably has a high current gain. Terminals B₁₁ and B₁₂ of capacitive member C₁ are respectively connected to the collector of transistor T₄₁ and to a source (not shown) of D.C. reference voltage REF. Similarly, terminals B₂₁ and B₂₂ of capacitive member C₂ are respectively connected to the collector of transistor T₄₂ and the source of voltage REF.

Only the operation of integrator INTEG₁ is described in detail, because integrators INTEG₁ and INTEG₂ operate identically.

Assume that signal DEI is positive, as between times t₂ and t₃, for example, and that signal H/2 is low. Control device COM₁ therefore is activated so switches I₁₁ and I₂₁, are respectively closed and open, causing integrator INTEF₁ to integrate, in response to a positive charging current i_c, designated i_{c+}, flowing to capacitor C₁. Current i_{c+} is considered to perform a positive integration.

If signal DEI is negative, as between times t₀ and t₁, for example and signal H/2 remains at its low level, switches I₁₁ and I₂₁, are respectively open and closed, whereby a negative charging current i_c (designated i_{c−}) flows to capacitor C₁ and integrator INTEG₁ performs a negative integration. Thus $i_c = i_{c+}$, if DEI is positive, and $i_c = i_{c-}$, if DEI is negative.

If i_b is the base current of transistors T₄₁ and T₃₁, or T₄₂ and T₃₂ then, regardless of the direction of current i_c:

$$i_c = i_e - 2i_b = i_e(1 - 2i_b/i_e) = i_e(-2/\beta),$$

where β is the current gain of transistor T₄₁ or T₄₂. If β is greater than 100, $i_c = i_e$ and the charging current flowing to capacitor C₁ or C₂ is proportional to the frequency F_O.

The following table summarizes the operation of switching apparatus AIG and its four switches I₁₁, I₂₁, I₁₂, I₂₂, and that of the integrators INTEG₁ and INTEG₂. The convention adopted uses (1) and (0) to respectively indicate the closed and open states of the switches; the ratio $i_c/i_e$ is equal to 1 for a positive integration and equal to −1 for a negative integration. The charging current for INTEG₂ is termed i'_c.

| $(i_c/i_e)$ | Switch I₁₁ | Switch I₂₁ | Switch I₁₂ | Switch I₂₂ | $(i'_c/i_e)$ |
|---|---|---|---|---|---|
| +1 | 1 | 0 | 0 | 0 | 0 |
| −1 | 0 | 1 | 0 | 0 | 0 |
| 0 | 0 | 0 | 1 | 0 | +1 |
| 0 | 0 | 0 | 0 | 1 | −1 |

The zero reset circuit DISRAZ shown in FIG. 6 comprises: first and second, preferably identical, diode bridges P₁ and P₂ respectively forming zero reset circuits CIRCRAZ₁ and CIRCRAZ₂ for integrators INTEG₁ and INTEG₂; diodes DIOD₁ and DIOD₂; as well as transistor switches Q₁ and Q₂ which respectively control bridges P₁ and P₂.

In the described embodiment, the first diode bridge P₁ comprises four "Schottky" diodes P₁₁, P₁₂, P₁₃, P₁₄, such as diodes of the HP - 5082 - 2013 type manufactured by Hewlett-Packard. Terminals P₁ S₂ and P₁ S₁ of bridge P₁ are respectively connected to terminal B₁₁ of capacitive member C₁ and to resistor R₆₁, in turn connected to diode DIOD₁ and via switch Q₁ to a source of positive voltage V_p, equal to +5 volts for example. Terminals P₁ S₄ and P₁ S₃ are respectively connected to a source of negative voltage V_R (equal to −5 volts, for example) and to resistor R₅₁, in turn connected to diode DIOD₂ and to the positive voltage source V_p = +5 V by switch Q₂.

Diode bridge P₂ similarly comprises four Schottky type diodes P₂₁ to P₂₄. Terminals P₂ S₂ and P₂ S₄ are respectively connected to terminal B₂₁ of capacitive member C₂ and to the negative voltage source V_R = −5 V. Terminal P₂ S₁ is connected to diode DIOD₂ via a resistor R₅₂ and to the source of voltage V_p via switch Q₂, while terminal P₂ S₃ is connected to diode DIOD₁ via a resistor R₆₂ and to source V_p via switch Q₁. The cathodes of diodes DIOD₁ and DIOD₂ are connected to a source of negative voltage V_n = −9 volts. Resistors $R_{51}$ and $R_{52}$ preferably have identical values, as do $R_{61}$ and $R_{62}$.

The following description is restricted to the operation of the diode bridge $P_1$ which controls the resetting to zero of integrator $INTEG_1$ as illustrated by FIGS. 7a, 7b, 7c; the operation of bridge $P_2$ is identical to that of bridge $P_1$.

In describing the integrating apparatus of the invention, it is assumed that capacitor $C_1$ has returned to its initial, discharged state, whereby voltage $V_{B11}$ is equal to $V_R$, i.e. is equal to $-5$ V; also assume terminal $B_{12}$ is maintained at a D.C. reference voltage REF, equal to $+5$ V. The positive and negative charges supplied to capacitor $C_1$ correspond to variations $\Delta V_{B11}$ in the voltage $V_{B11}$, respectively equal to $+2$ V and $-2$ V. Thus, after a positive integration, $$V_{B11} = -5 + \Delta V_{B11} = (-5+2) = -3 \text{ V},$$

and after a negative integration $$V_{B11} = (-5-2)V = -7 \text{ V}.$$

In the first case to be considered, capacitor $C_1$ returns to its initial state after a positive integration, as illustrated by FIG. 7A, whereby switches $Q_1$ and $Q_2$ are respectively closed and open. Voltages $V_H$, $V_{BAS}$ and $V_{B11}$ are respectively equal to $+5$ volts, $-9$ volts, and $-3$ volts. Since under these circumstances $V_H$ is greater than $V_R$ and since $V_{B11}$ is greater than $V_{BAS}$, diodes $P_{11}$ and $P_{13}$ are unblocked. Since the voltage drop across the terminals of the unblocked Schottky diodes is approximately 0.4 volts, $V_{P1S3}$ and $V_{P1S1}$ respectively equal $-3.4$ volts and $-4.6$ volts, approximately. Diode $P_{14}$ is blocked because its anode voltage $V_R$ is less than its cathode voltage $V_{P1S3}$ while diode $P_{12}$ is blocked because its anode voltage $V_{P1S1}$ is less than its cathode voltage $V_{B11}$. Capacitor $C_1$ therefore discharges through diode $P_{13}$ and resistor $R_{51}$.

When capacitor $C_1$ has completed its discharge, (the condition illustrated in FIG. 7B) voltage $V_{B11}$ is very close to $-5$ volts and diodes $P_{11}$ and $P_{13}$ remain unblocked since their anode voltages are higher than their cathode voltages. However, diodes $P_{14}$ and $P_{12}$ are also unblocked, because the cathode voltage $V_{P1S3}$ of diode $P_{14}$ equals $-5.4$ V and is thus less than its anode voltage $V_R = -5$ volts, and the cathode voltage $V_{B11}$ of diode $P_{12}$ is less than its anode voltage $V_{P1S1}$ (which is still equal to $-4.6$ V). When the discharge of capacitor $C_1$ has been completed, diode bridge $P_1$ is balanced, with $V_{B11} = V_R$.

The case which will now be considered is that of capacitor $C_1$ being reset to zero after a negative integration, as illustrated by FIG. 7C. $V_H$ is still equal to $+5$ volts and $B_{BAS}$ equal to $-9$ volts. Thus, $V_{B11} = -5 - 2 = -7$ volts. Under these conditions, diode $P_{12}$ is unblocked and its anode voltage $V_{B1}$ is such that $V_{P1S1} - V_{B11} = 0.4$ V, thus making $V_{P1S1}$ equal to $-6.6$ volts. Diode $P_{11}$ is therefore blocked, its cathode voltage $V_R = -5$ volts being greater than $V_{P1S1}$. Diode $P_{14}$ is unblocked since its anode voltage $V_R = -5$ volts is very much higher than voltage $V_{BAS} = -9$ volts. Voltage $V_{P1S3}$ is therefore equal to $-5.4$ volts and is thus greater than $V_{B11}$. Consequently, diode $P_{13}$ is blocked. Capacitor $C_1$ discharges through diode $P_{12}$ and resistor $R_{61}$.

At the end of discharge, the diode bridge $P_1$ is again balanced (see FIG. 7B). Both in the case of a positive integration (the circuit formed by $C_1$ - diode $P_{13}$ - resistor $R_{51}$) and in the case of a negative integration (the circuit formed by $C_1$ - diode $P_{12}$ - resistor $R_{61}$), the time-constant of the discharge circuit for capacitor $C_1$ is such that the zero reset of capacitor $C_1$ is completed by times $t'_1$, $t'_3$, $t'_5$, etc., which lie between times $t_1$ and $t_2$, $t_3$ and $t_4$, $t_5$ and $t_6$, etc. respectively and which are such that (see FIG. 2) $\begin{cases} t'_1 < t_2 \\ t'_3 < t_4 \\ t'_5 < t_6 \end{cases}$ While there has been described and illustrated one specific embodiment of the invention, it will be clear that variations in the details of the embodiment specifically illustrated and described may be made without departing from the true spirit and scope of the invention as defined in the appended claims. For example digital integrators (counters) and techniques could be used, in which case the rate at which pulses are supplied to the integrators would be controlled by the frequency of signal DE, the counting direction would be controlled by the direction of the center transition and the integration period would be controlled by the period of signal DE.

What is claimed is:

1. Apparatus for integrating a series of bi-level electric bits, comprising at least one integrator containing a capacitive integrating member, a device for controlling the integrator responsive to the series of bits for controlling the duration and direction of charging current flowing in the capacitive member as a function of the direction and duration of each individual bit in the series, a circuit for resetting the integrator to zero at the end of each integrating operation of each bit, a generator responsive to the repetition rate of the bits for supplying the capacitive integrating member with a charging current proportional to the nominal frequency $F_O$ of the bilevel bits.

2. The apparatus of claim 1, wherein the apparatus comprises first and second integrators, a switching device connected between an output of said current generator and inputs of the first and second integrators, said switching device including first and second devices for respectively controlling the first and second integrators, first and second circuits for respectively resetting the first and second integrators to zero, the switching device being responsive to the bits to be integrated and the current supplied by the said current generator such that the first integrator is in integrating operation while the second is being reset to zero by its zero reset circuit, and vice-versa.

3. Apparatus according to claims 1 or 2 wherein each circuit for resetting an integrator to zero comprises a diode bridge having a first terminal connected to one terminal of the capacitive integrating member of the integrator associated with the resetting circuit, another terminal of said member being connected to a constant reference voltage, a second terminal of the bridge, diagonally opposite from the first terminal being connected to said voltage, the other two opposing diagonal terminals of the bridge being respectively connected to sources of different constant voltages derived by a device for controlling the bridge.

4. Apparatus according to claims 1 or 2 wherein each control integrator device comprises first and second switches, one of which is closed while the other is open, said switches being connected to the integrator and current sources whereby closing of the first switch causes positive integration by the integrator while the closure of the second switch causes negative integration.

5. Apparatus according to claims 1 or 2 wherein each integrator includes a negative current generator that drives a capacitive integrating member.

6. Apparatus for detecting the binary value of coded signals having opposite going transitions normally in the center of a bit cell, the direction of the transition determining the binary value of the bit cell, the bit cells being subject to phase distortion causing a shift in the center position of the transition, comprising integrator means, means responsive to the repetition rate of bit cells of a coded signal for controlling the rate at which a signal to be integrated is accumulated by the integrator means, means responsive to the bit cell period for controlling the integration duration of the integrator means, means responsive to the direction of the center transition of each bit cell for controlling the integration direction of the integrator means during each bit cell, and means responsive to the amplitude of the accumulated signal at the end of the integration duration relative to a reference amplitude for indicating the binary value of the bit in the bit cell.

7. Apparatus according to claim 6 wherein the integration means includes first and second integrators, means for respectively activating the first and second integrators to accumulate the signal to be integrated during odd and even numbered bit cells, means for respectively resetting the first and second integrators to zero during even and odd numbered bit cells, said indicating means including means for respectively responding to the accumulated signal of the first and second integrators prior to resetting thereof to indicate the binary values of the odd and even numbered bit cells.

8. A method of detecting the binary value of coded signals having opposite going transitions normally in the center of a bit cell, the direction of the transition determining the binary value of the bit cell, the bit cells being subject to phase distortion causing a shift in the center position of the transition, comprising sensing the repetition rate of bit cells of a coded signal, in response to the sensed repetition rate controlling the rate at which a value is integrated, in response to the sensed repetition rate controlling the integration duration, sensing the direction of the center transition of each bit cell, in response to the sensed direction, controlling the direction of the integration during each bit cell, and sensing the amplitude of the accumulated, integrated value at the end of the integration duration relative to a reference amplitude to indicate the binary value of the bit in the bit cell.

* * * * *